United States Patent [19]

Bedel

[11] Patent Number: 4,503,360
[45] Date of Patent: Mar. 5, 1985

[54] COMPACT FLUORESCENT LAMP UNIT HAVING SEGREGATED AIR-COOLING MEANS

[75] Inventor: Denis E. Bedel, Ross Township, Allegheny County, Pa.

[73] Assignee: North American Philips Lighting Corporation, New York, N.Y.

[21] Appl. No.: 402,003

[22] Filed: Jul. 26, 1982

[51] Int. Cl.³ .......................... H01J 7/24; H01J 17/28; H01J 19/74; H01J 13/32
[52] U.S. Cl. .................... 315/112; 362/373; 313/493; 313/19; 315/50; 315/56
[58] Field of Search ................... 315/50–53, 315/58, 62, 112, 56, 57; 313/493, 19, 20, 23, 33; 362/216, 373

[56] References Cited

U.S. PATENT DOCUMENTS

| D. 262,406 | 12/1981 | Zagransky | D26/2 |
|---|---|---|---|
| 2,504,594 | 4/1950 | Schouwstra et al. | 315/53 |
| 4,173,730 | 11/1979 | Young et al. | 315/53 |
| 4,270,071 | 5/1981 | Morton | 315/62 |
| 4,300,073 | 11/1981 | Skwirut et al. | 315/53 |
| 4,337,414 | 6/1982 | Young | 315/56 |
| 4,363,083 | 12/1982 | Tanaka et al. | 362/373 |
| 4,375,607 | 3/1983 | Morton et al. | 315/56 |
| 4,389,595 | 6/1983 | Kamei et al. | 315/57 |

*Primary Examiner*—Saxfield Chatmon

[57] ABSTRACT

Convection air-cooling of a compact electric discharge lamp unit that is adapted for use as a screw-in energy-conserving substitute for an incandescent-type lamp bulb is enhanced by partitioning the lamp housing into two separate compartments and providing vents and connecting air passageways that direct ambient air through the respective housing compartments along two different paths—thereby cooling the compartments independently of one another. A light source (such as a convoluted low-pressure discharge lamp) is located within one of the compartments and an electrical circuit for energizing the lamp is located in the other compartment. The "segregated air-flow" mode of cooling prevents heat that is generated by the lamp from being introduced into the compartment that contains the electrical circuit and thus prevents the circuit components from becoming overheated and possibly damaged. This is an important advantage in the case of solid-state type electronic circuits that include components such as electrolytic capacitors and transistors or the like that are heat-sensitive and may fail if they become too hot. In a preferred embodiment the light source comprises a replaceable plug-in fluorescent lamp of triple-U-bent configuration that has a plastic base member with tongue-and-groove elements which permit the fluorescent lamp to be snap-locked into operative relationship with the partition and circuit components of the lamp housing.

22 Claims, 31 Drawing Figures

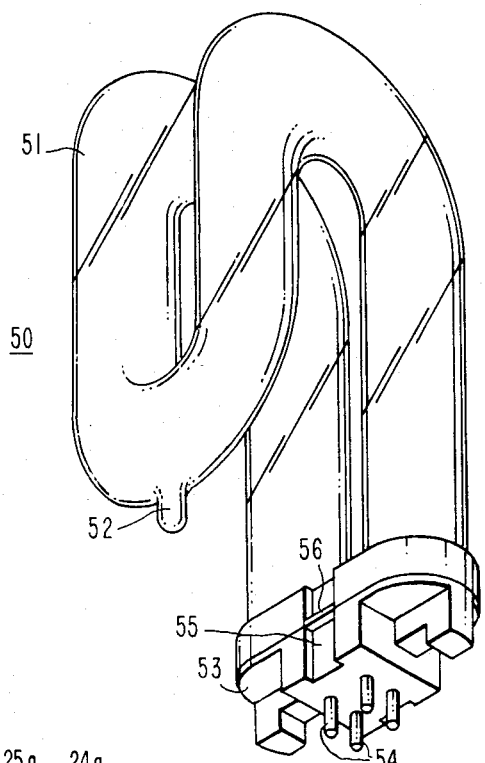
FIG. 10
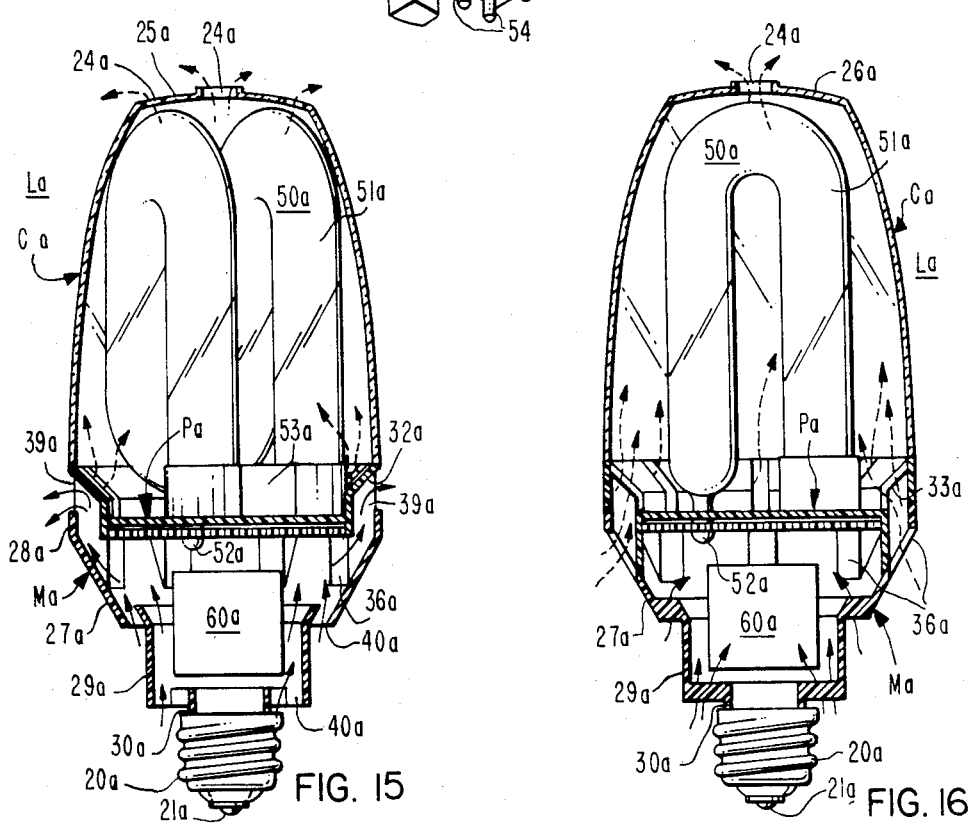
FIG. 15
FIG. 16

COMPACT FLUORESCENT LAMP UNIT HAVING SEGREGATED AIR-COOLING MEANS

CROSS-REFERENCE TO RELATED APPLICATIONS

This application discloses and claims a compact lamp unit which constitutes an improvement over the related subject matter disclosed and claimed in the following pending applications, each of which are assigned to the assignee of the present application:

Application Ser. No. 97,279, now U.S. Pat. No. 4,331,414, of Robert G. Young filed Nov. 26, 1979 and entitled "Compact Fluorescent Lamp Having Convoluted Tubular Envelope of Tridimensional Configuration, Method of Making Such Envelope, and Lighting Unit Incorporating Such Lamp";

Application Ser. No. 216,216 of Henry Skwirut et al. filed Dec. 12, 1980 and entitled "Compact Lighting Unit Having a Convoluted Fluorescent Lamp with Integral Mercury-Vapor Pressure-Regulating Means, and Method of Phosphor-Coating the Convoluted Envelope for Such a Lamp";

Application Ser. No. 246,502, now U.S. Pat. No. 4,375,607, of Edward W. Morton et al. filed Mar. 23, 1981 entitled "Compact Lamp Unit Having Plug-In Fluorescent Lamp and Module Components";

Design Application Ser. No. 245,870 U.S. Pat. No. Des. 272,653 of Edward W. Morton et al. filed Mar. 23, 1981 and entitled "Compact Fluorescent Lamp"; and Application Ser. No. 294,953, now U.S. Pat. No. 4,463,286, of James W. H. Justice filed Aug. 21, 1981 and entitled "Lightweight Electronic Ballast for Fluorescent-Lamps".

The design features of the various compact lamp units disclosed in this application are claimed in concurrently-filed design application Ser. No. 402,793 of D. E. Bedel, the author of the present invention, which design application is assigned to the same assignee as this application.

Designs for related types of air-cooled compact electric lamps are also disclosed and claimed in concurrently-filed design applications of the present inventor, D. E. Bedel, Ser. Nos. 402,194 and 402,192 both of which are also assigned to the assignee of this application.

BACKGROUND OF THE INVENTION

This invention relates to electric lamps and has particular reference to an improved lamp unit of compact size that employs a fluorescent lamp of convoluted configuration as the light source and is adapted for use in residential and commercial lighting fixtures which are designed for incandescent-type lamps.

Fluorescent lamp units that are specially constructed for use in conventional lighting fixtures having screw-type sockets are well known in the art. A lamp unit of this type having a triple-U-bent fluorescent lamp that is mounted on a base structure along with circuit means and is protected by a cover component which has one or more vent openings which cooperate with similar vent openings in the base structure to permit air to circulate through the lamp unit during operation and provide convection cooling is disclosed in U.S. Pat. No. 4,300,073 issued Nov. 10, 1981 to Henry Skwirut et al.

An air-cooled fluorescent lamp unit of the same type having an improved base member which is partitioned into two compartments to separate the ballast inductor from the ballast capacitor and thus facilitate cooling of these components by the circulating air flow is disclosed and claimed in U.S. Pat. No. 4,270,071 issued May 26, 1981 to Edward W. Morton.

It is also well known to provide a compact screw-in type fluorescent lamp unit with a base module that contains a miniaturized solid-state electronic circuit which permits the fluorescent lamp to be operated in a direct-current mode from an AC power source. A fluorescent lamp unit having such an integral DC-operating circuit is disclosed in U.S. Pat. No. 4,173,730 issued Nov. 6, 1979 to Robert G. Young et al.

Screw-in type lamp units having triple-U-bent lamp components that are protectively enclosed by covers of various shapes which are secured to base modules having a tapered portion are disclosed in U.S. Pat. No. Des. 262,406 issued Dec. 22, 1981 to Fritz E. Zabransky.

While the aforementioned pending Young, Skwirut et al., Morton et al. and Justice applications (together with U.S. Pat. Nos. 4,270,071 and 4,300,073) disclose various structural and circuit improvements for compact fluorescent lamp units, cooling of the convoluted discharge lamp and/or circuit components in each of the lamp units disclosed in such pending applications and prior patents is achieved by providing the cover and base module with one or more vent openings which cooperate with similar openings in the lamp-support structure or member within the housing in such a manner that air circulates through the entire lamp unit in a single flow pattern that traverses both of the compartments or chambers that are defined by the cover and base module. Hence, when such lamp units are burned in a "base-up" position, ambient air enters the vent openings in the protective cover, flows past the convoluted fluorescent lamp into the base module or structure which contains the circuit components and finally emerges from the unit through the vent openings in the base module or structure. If the prior art lamp units are burned in a "base-down" position, ambient air flows in a reverse direction and enters the unit through the vent openings in the base module, flows through the module compartment past the circuit components, up through the cover component past the discharge lamp and then out of the unit through the vent opening or openings in the top of the protective cover.

Hence, in each of the prior art lamp units the lamp-containing and circuit-containing compartments of the unit are interconnected and convection cooling is achieved by having the cool outside air circulate through the unit in a single flow pattern. While the resulting "uniflow" cooling concept is satisfactory and prevents the convoluted fluorescent lamp from overheating and exhibiting a characteristic drop in light output, it has been discovered that heat generated by the lamp is transferred into the base module under certain operating conditions with the result that the temperature within the module compartment is increased. This is particularly disadvantageous in the case of solid-state type electronic circuits of the kind disclosed and claimed in the aforementioned pending application Ser. No. 294,953 of Justice which employ components such as electrolytic capacitors, transistors and the like that are heat-sensitive and may fail if they become too hot.

The present invention overcomes these problems and disadvantages by providing a compact fluorescent lamp unit which is so constructed that air is directed through the lamp unit along two separate paths which produce flow patterns such that the discharge lamp that is located within the protective cover is air-cooled independently of the circuit components which are housed within the base module. This segregated or "dual-flow" mode of air-cooling the two main compartments of the lamp unit is achieved in accordance with a preferred embodiment by physically isolating and separating the lamp and circuit compartments from each other by an internal partition structure that extends laterally across the lamp unit at the point where the cover and base module interface with and are coupled to one another. The transverse partition structure is conformed to nest within the top portion of the base module and has a number of air ducts and recessed portions which cooperate with port openings and vents in the module walls to provide air passageways which direct ambient air through the lamp unit in two separate flow patterns— one which traverses the base module and another which allows air to circulate through the lamp compartment by means of a number of openings located around the periphery of the partition member and one or more vent openings in the top of the cover component. In addition to the "split-flow" patterns for the circulating air, the transverse partition structure is also so constructed that it serves as the support means for the convoluted fluorescent lamp and the circuit components which are located within the cover and base module, respectively.

Various alternative lamp unit embodiments which provide the desired "dual-flow" air paths by employing cover components and base modules of various shapes and construction in conjunction with an internal partition structure are also disclosed.

BRIEF DESCRIPTION OF THE DRAWINGS

A better understanding of the invention will be obtained from the exemplary embodiments shown in the accompanying drawings wherein:

FIG. 10 is a perspective view of the plug-in fluorescent lamp component of triple-U-bent configuration which is employed as the "snap-interlocking" light source in the compact lamp unit shown in the preceding Figures;

FIGS. 15 and 16 are longitudinal sectional views through the lamp unit (along lines XV—XV and XVI—XVI, respectively, of FIG. 13) showing the manner in which air circulates through the lamp and circuit compartments of the unit along two separate paths in accordance with the invention;

DESCRIPTION OF THE PREFERRED EMBODIMENTS

While the improved "dual-flow" air-cooling concept of the present invention can be used in compact lamp units that are designed for use in various types of lighting fixtures and employ electric discharge lamp components of various configurations as the light source, it is especially adapted for use in conjunction with compact lamp units that contain fluorescent lamps having convoluted tubular envelopes and are energized by integral electronic circuits of the miniaturized solid-state type.

The invention has accordingly been so illustrated and will be described in terms of lamp units having such lamp and circuit components.

Figure 1:
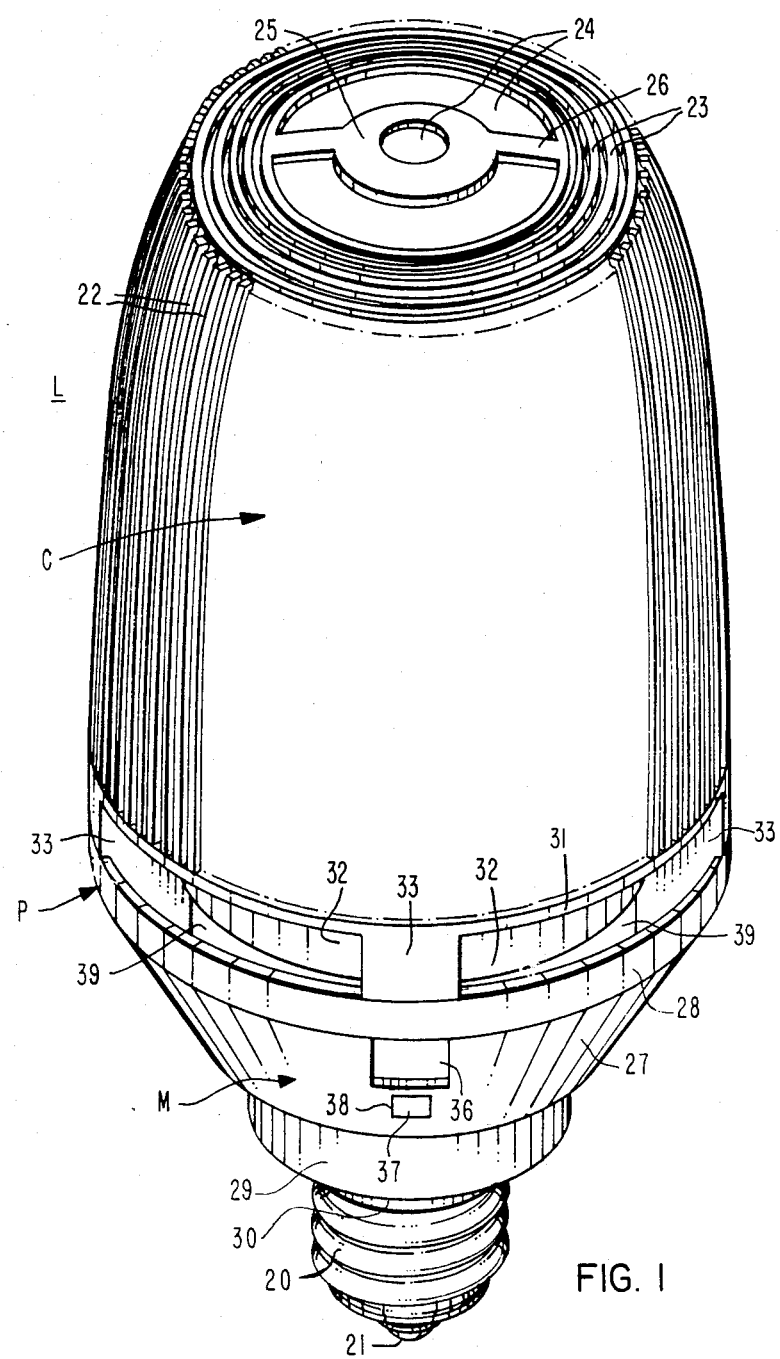
FIG. 1 is an enlarged perspective view of a compact fluorescent lamp unit that provides segregated "dual-flow" air-cooling in accordance with the invention.
Figure 2:
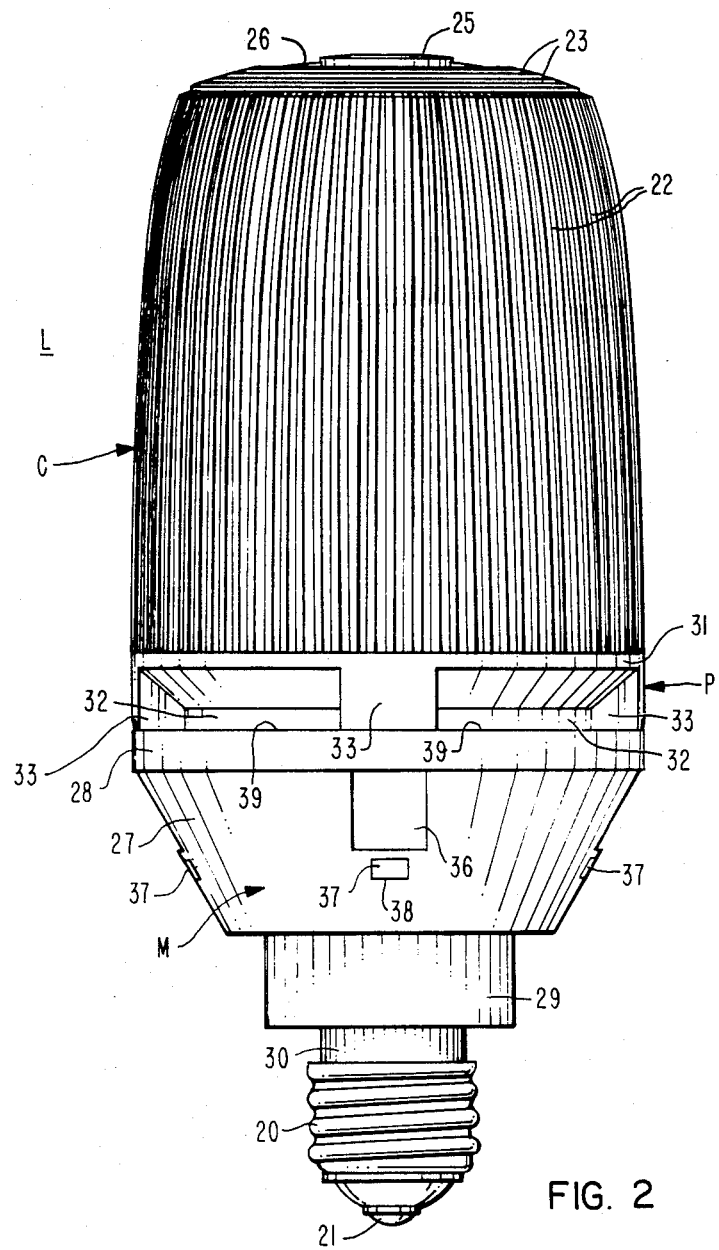
FIG. 2 is a side-elevational view of the lamp unit shown in FIG. 1.

A preferred embodiment of a compact lamp unit L that is adapted for use as a replacement for a screw-in type incandescent lamp in various kinds of lighting fixtures is shown in FIGS. 1-4. As will be noted, the lamp unit comprises a light-transmitting protective cover component C that is coupled to a base module M and thus forms an elongated housing of circular cross-section. The module M is terminated by a suitable threaded base member 20 having the usual end contact 21. The cover C is perferably fabricated from a suitable heat-resistant plastic (such as a polycarbonate type resin sold commercially by the General Electric Co. under the trademark "LEXAN") and has a plurality of light-diffusing flutes or diffractor elements 22 that extend longitudinally along the outer surface of the cover and provide a corrugated surface effect which eliminates undesirable glare light when the lamp unit L is energized and in use. The top or "dome end" of the cover C also has a plurality of concentric light-diffusing flutes 23 and its central portion has vent openings 24 of circular and semi-circular cconfiguration that are defined by an annular segment 25 of the cover that is held in place by a pair of laterally extending straps 26 which are formed as integral parts of the cover. The module M is also preferably fabricated from a suitable heat-resistant plastic and, as shown in FIGS. 1 and 2, has a tapered medial portion 27 which merges with a circular flange 28 at its largest dimension and is terminated at its smallest dimension by a cylindrical portion 29 of smaller diameter which, in turn, is terminated by another cylindrical portion 30 of even smaller dimension. The threaded base member 20 is fastened in telescoped relationship to cylindrical portion 30 by suitable means such as an epoxy type glue or cement.

Figure 9:
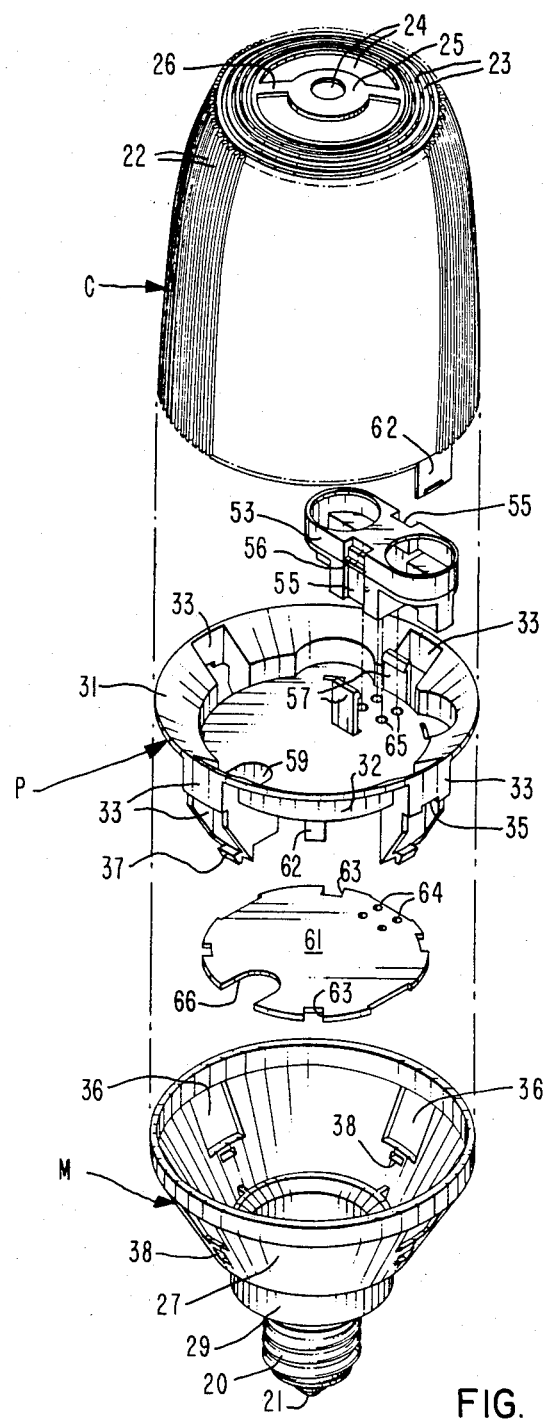
FIG. 9 is an exploded perspective view, on a reduced scale, of the various parts of the lamp unit which form the housing and support structures for the convoluted fluorescent lamp component and electric circuit components, the lamp and circuit components being omitted to better illustrate the manner in which the various parts snap-interfit with one another.
Figure 11:
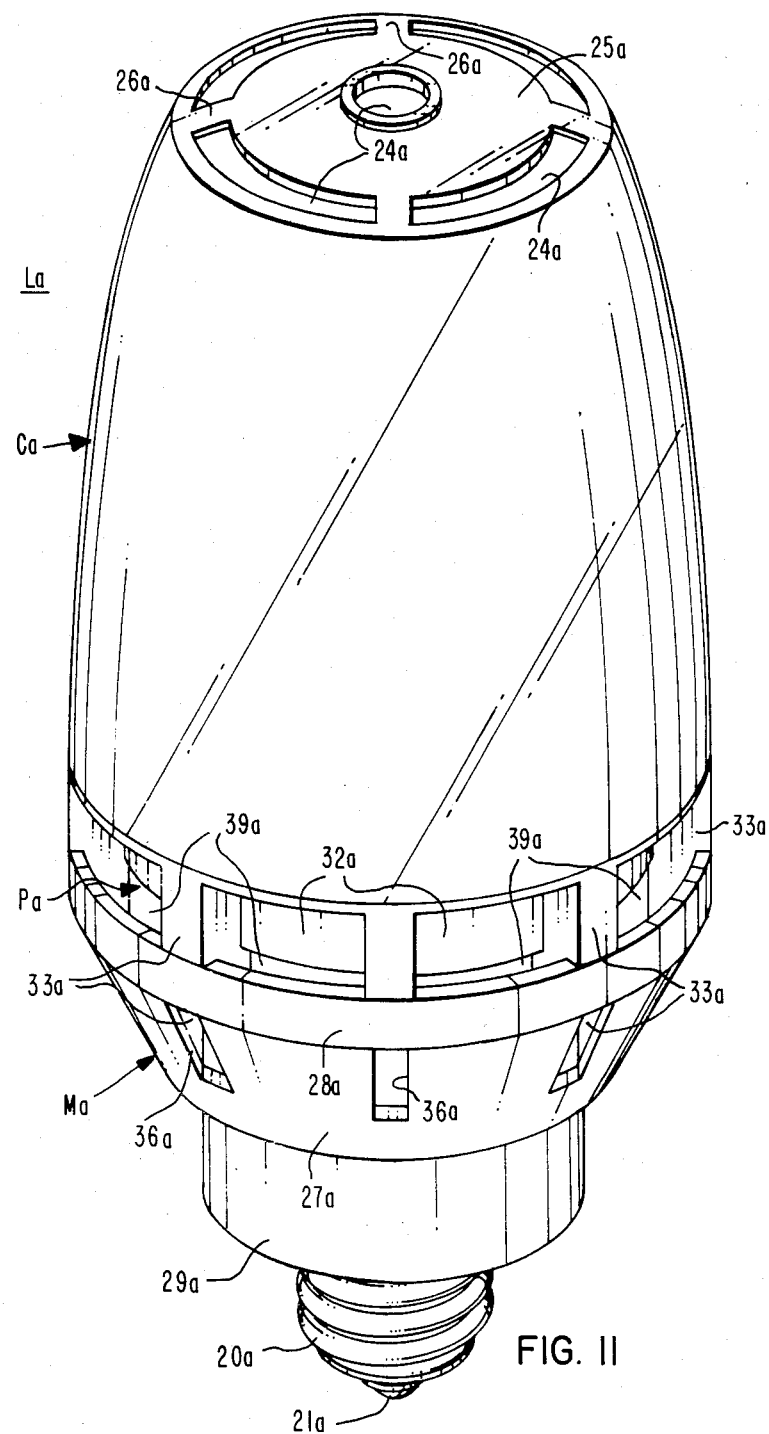
FIG. 11 is an enlarged perspective view of an alternative embodiment of a compact fluorescent lamp unit having a modified air duct and vent arrangement for circulating air through the cover and base module compartments along separate paths.
Figure 13:
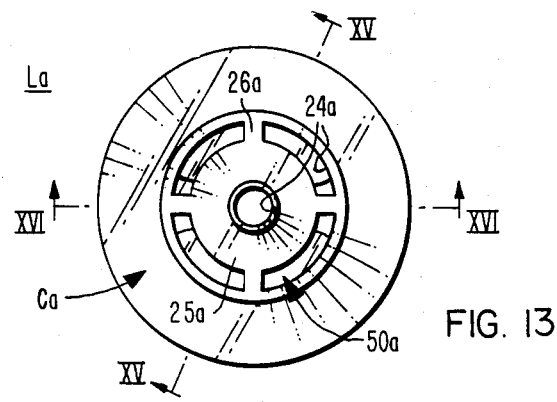
FIGS. 12–14 are side-elevational, top and bottom plan views, respectively, of the alternative lamp unit shown in FIG. 11.
Figure 12:
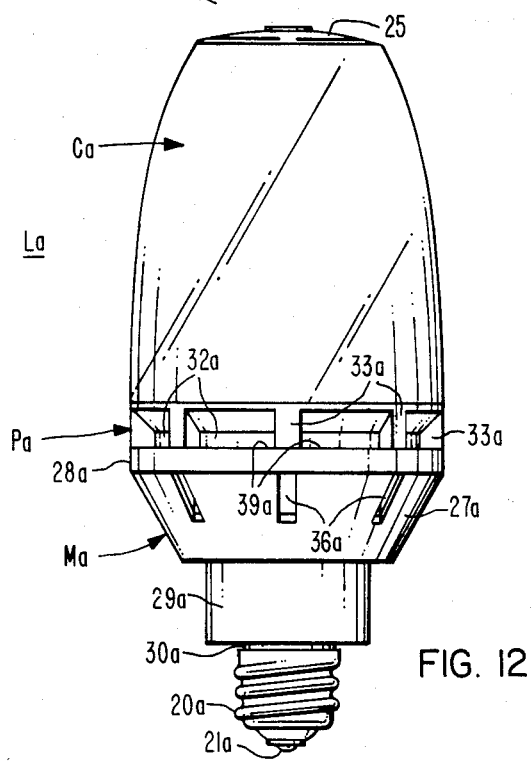
Figure 14:
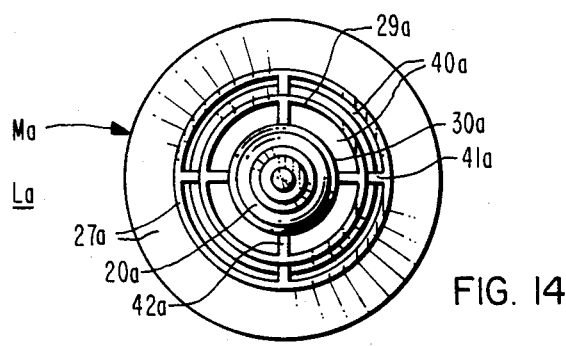

The elongated housing formed by the cover C and base module M is circular in cross section and these two components are coupled to one another by a circular partition structure P that extends transversely across the lamp unit L and physically separates the cover compartment from the module compartment. The partition structure P (as shown in FIG. 9) preferably comprises a one-piece dish-like member of suitable plastic conformed to have a circular rim portion 31 that is secured in snug-fitting relationship with the cover C and has a plurality of inwardly-tapered recessed portions 32 that extend around the periphery of the partition member P. The recessed portions 32 are separated from one another by a number of hollow air ducts 33 that are part of the partition P and extend into the base module M and communicate with a plurality of port openings 36 in the tapered medial portion 27 of the module. The partition member P and its air ducts 33 are so shaped and dimensioned that the exposed faces of the ducts are flush with the rim of the cover C and the flange 28 of the module M (as shown in FIGS. 1 and 2) with the downwardly-extending portions of the air ducts being nestingly seated against the inner wall of the module M. Each of the air ducts 33 have a protruding lug 37 that engages a mating opening 38 in the tapered wall portion 27 of the module M and permits the partition member P to be locked in snap-fitting relationship with the module M, as hereinafter disclosed in detail.

Figure 4:
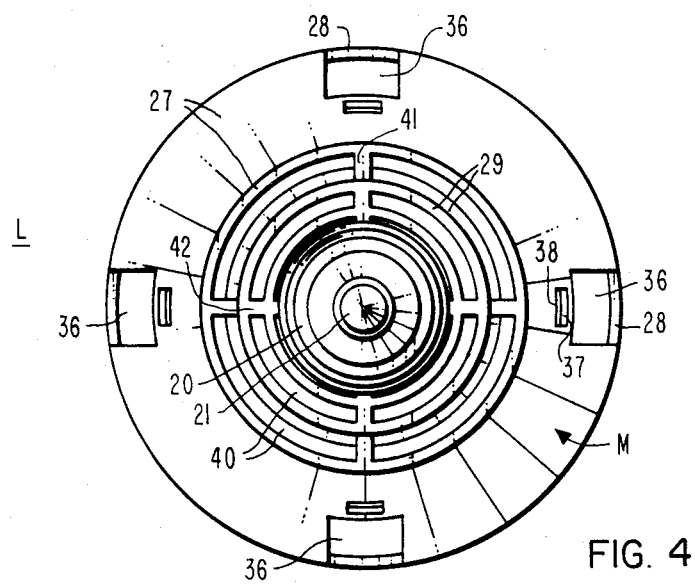

As shown in FIG. 1, the contour of the recessed portions 32 of the partition P is such that they provide a series of circumferentially extending air-vent openings 39 into the lamp unit L. These circumferential air vents 39 permit air to circulate freely through the module compartment by way of another group of vent openings located at the ends of the tapered portion 27 and adjacent cylindrical portion 29 of the base module M. The additional vent openings 40 are shown in FIG. 4 (which is a plan view looking up into the bottom of the lamp unit L). As illustrated, the cylindrical portion 29 of the module M is hollow and supported in concentric-spaced relationship with the other cylindrical portion 30 (not visible) and the rim of the tapered portion 27 of the module M by two sets of radial struts 41, 42 that are formed as integral parts of the module. In the illustrated embodiment, each set consists of four struts 41, 42 that are evenly spaced to provide a plurality of arcuate vent openings 40 and a grid-like structure which permit the free passage of air into (or out of) the module M at locations immediately adjacent the threaded base member 20.

As disclosed in more detail hereinafter, the arcuate vent openings 40 cooperate with the peripheral openings 39 provided by the recessed portions 32 of the partition P in such a manner that ambient air can flow freely through the compartment defined by the base module M and partition when the lamp unit L is energized and in use. A separate path for the circulation of cooling air through the compartment defined by the partition and cover C is provided by the port openings 36 in the tapered portion 27 of the module M which, along with the connecting air duct segments 33 of the partition P and the vent openings 24 in the top of the cover C, define unobstructed air-passageways through the cover compartment and a second air path which is completely isolated physically from the cooling air path through the module compartment.

The unique construction of the cover component C, partition P and base module M accordingly provides a compact lamp unit L that has a housing which provides a "dual-flow" arrangement for convection air-cooling the light source that is enclosed by the cover C and the energizing electrical circuit that is disposed within the module M. This segregated and independent mode of cooling the lamp and circuit compartments of the lamp unit L is very advantageous insofar as it prevents the heat generated by the compact light source from being conveyed into the module compartment and overheating the circuit elements, especially in the case of a miniaturized solid-state type electronic circuit that includes transistors and/or electrolytic capacitors that are heat-sensitive and will fail if they became too hot. Since the compact light source (a fluorescent lamp in the illustrated embodiment) inherently consumes more power than the energizing circuit, the light source generates more heat than does the circuit. Optimum cooling is thus achieved by channeling ambient air through the lamp and electrical-circuit compartments directly from outside the lamp unit and in two separate flow patterns in accordance with the present invention.

In the "uniflow" mode of convection air-cooling used in the prior art lamp units, the air which circulated through the lamp compartment inherently first flowed through the module compartment (when the lamp unit was burned in a "base-down" position) and was thus heated by the components of the energizing circuit before flowing past the lamp. In "base up" burning the heat transfer was even worse since the ambient air first flowed past the lamp unit and was heated to a higher temperature. Efficient cooling of the light source is important in the case of a fluorescent lamp (and similar low-pressure discharge lamps) insofar as the light output of such lamps progressively decreases as the pressure of the ionizable medium (mercury vapor, etc.) within the lamp exceeds an optimum value due to elevated lamp-operating temperatures.

Figure 3:
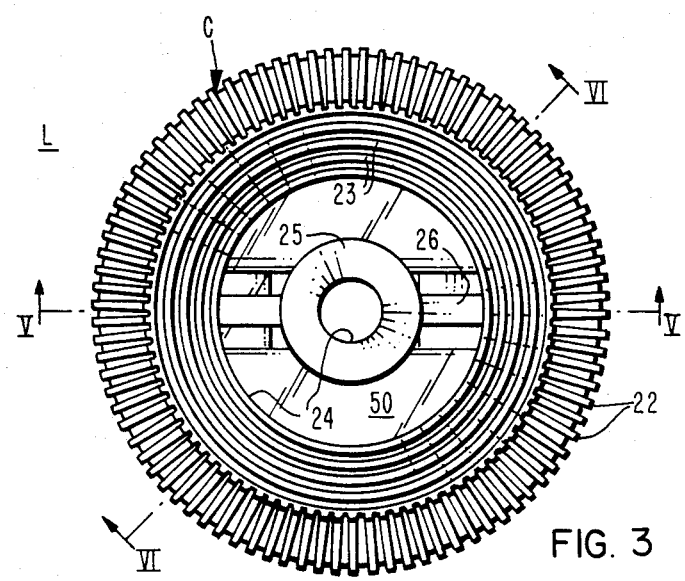
FIGS. 3 and 4 are top and bottom plan views, respectively, of the lamp unit showing the vent openings in the cover and base module components.

As partially shown in FIG. 3, the lamp unit L contains a fluorescent lamp 50 which has a convoluted tubular envelope of such shape and dimensions that it snugly fits within the cover C. The convoluted fluorescent lamp 50 is shown in full view in FIG. 10 and has a tubular glass envelope 51 that is bent into three conjoined U-shaped sections. The envelope is provided with the usual inner coating of a suitable phosphor (or blend of phosphors) and contains a suitable ionizable medium such as a fill gas at low pressure and small amount of mercury. The U-bend which comprises the center of the envelope 51 is preferably provided with a depending tubular appendage such as a tip 52 of clear glass which serves as a "cooling tip" for the lamp and thus provides a relatively cool region within the envelope where mercury vapor can condense and thus regulate the mercury-vapor pressure within the lamp 50 during operation. The sealed end segments of the envelope tubing 51 are fitted with a base 53 of suitable insulating material such as plastic having four protruding pins 54 which permit the lamp to be plugged into suitable socket means within the lamp unit L. The body portion of the plug-in base 53 is shaped to engage clasping means such as a pair of lugs 57 on the internal socket portion of the partition P in a snap-interlocking action and the base 53 is provided with a groove 55 and protruding tongue 56 on each side for this purpose.

Figure 5:
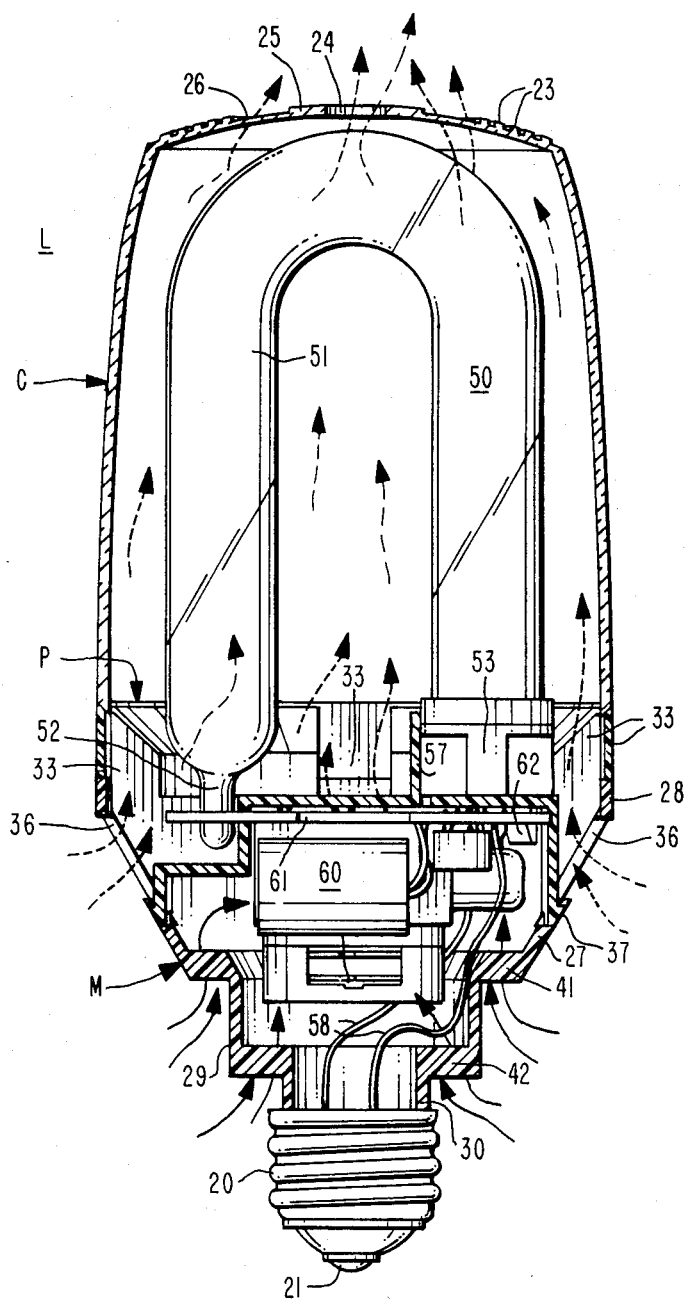
FIG. 5 is a longitudinal sectional view of the lamp unit along line V—V of FIG. 3 showing the manner in which ambient air flow (indicated by the dashed-line arrows) is restricted to but freely circulates through the lamp compartment of the unit defined by the cover and partition components.
Figure 6:
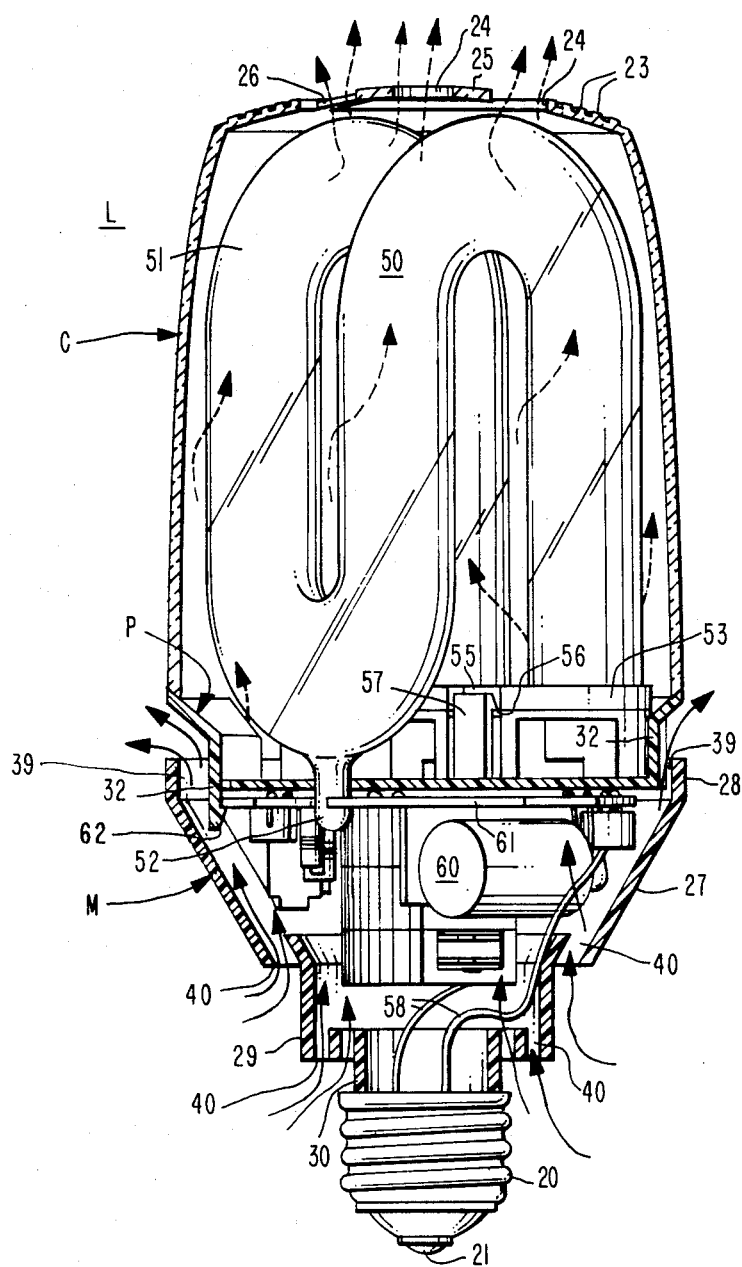
FIG. 6 is a similar longitudinal sectional view through the lamp unit along line VI—VI of FIG. 3 showing the other air-flow pattern (indicated by the solid-line arrows) which is restricted to the base module but allows air to circulate freely around the various components of a solid-state circuit that is located within the module component.

As shown in FIGS. 5 and 6, the partition member P holds the snap-locked convoluted fluorescent lamp 50 in upstanding position within the cover component C with the lamp spaced from the walls of the cover to permit free air flow. The partition member P also serves as the support means for a solid-state electronic energizing circuit 60 which is located within the module chamber and is of such size that the circuit components are also spaced from the module walls. The circuit 60 is preferably of the type disclosed and claimed in the aforementioned pending application Ser. No. 294,953 of J. W. N. Justice and is adapted to convert an AC-current input into a DC output by combining a transformer, a choke, a capacitor and a pair of transistors in push-pull arrangement. As is pointed out in the aforementioned pending Justice application, this type of transistorized inverter circuit is particularly adapted for starting and operating a fluorescent lamp which forms part of a compact lamp unit insofar as the circuit is small, lightweight and very efficient. However, the circuit includes an electrolytic capacitor which is very heat-sensitive and will fail if overheated. The transistors and ferrite core of the transformer which are used in the circuit also have operating-temperature limits that could be exceeded without adequate ventilation of the base module M. Since the electronic circuit per se does not constitute an essential part of the present invention, it will not be described in detail and is generally identified by the reference numeral 60. However, for purposes of providing a complete disclosure of an operative lamp unit L, the details of the manner in which the transistorized inverter circuit is constructed and operates disclosed in the pending Justice application is incorporated herein by reference.

In order to facilitate assembling the various components of the lamp unit L, the electronic circuit is mounted on a rigid board or panel 61 of suitable non-conductive material such as plastic which is held in snug snap-interlock relationship with the underside of the partition member P by a pair of clasps or cleats 62 (see FIGS. 5 and 6) that extend from the partition member into the module chamber. As will be noted, suitable insulated conductors 58 within the module chamber connect the pin contacts of the fluorescent lamp 50 and electronic circuit 60 to the shell and end contacts of the screw-in base 20 so that a lamp unit L can be used as a direct substitute for an incandescent lamp in various kinds of lighting fixtures.

The manner in which the housing formed by the interlocked cover C, partition member P and base module M define air passageways which permit air to circulate freely through the lamp and circuit compartments in two different flow patterns that are confined to the respective compartments and thus air cool such compartments independently of one another when the lamp unit L is energized and in use is illustrated in FIGS. 5 and 6 and will now be described in detail.

In order to differentiate the separate air paths through the respective compartments of the lamp unit L, the arrows which indicate air flow through the lamp compartment in the various figures of the drawing are shown in dashed lines and those which denote air flow through the module compartment that contains the electronic circuit are shown in solid lines. The sectional view through the lamp unit L shown in FIG. 5 illustrates the unobstructed air-flow path through the lamp compartment in full detail. As will be noted, the passageways defined by the four air-duct portions 33 of the partition member P and the associated ports 36 in the module M permit air to flow into the lamp unit L at various points around the periphery of the lamp unit and flow past the convoluted fluorescent lamp 50 within the cover component C and then leave the lamp unit through the vent openings 24 in the top of the cover (as indicated by the dashed-line arrows). The fluorescent lamp 50 is thus continuously subjected to a stream of cool ambient air when the lamp unit L is energized and in use. Of course, if the lamp unit is burned in a "base-up" position rather than in the "base-down" position shown in FIG. 5, then the direction of air flow would be reversed and ambient air would enter the lamp unit L through the vent openings 24 in the cover C and emerge through the ports 36 in the module M.

As shown in FIG. 6, the path followed by the cool air stream through the module compartment (shown by the solid-line arrows) begins at the arcuate vent openings 40 defined by the grid-like structure which joins the cylindrical portions 29, 30 to the tapered portion 27 of the base module M, extends through the module chamber that contains the electronic energizing circuit 60 and then terminates at the peripheral air-passageways that are defined by the recessed portions 32 of the partition member P and the laterally spaced flange portion 28 of the base module. The various electrical-circuit components are thus continuously "washed" by a stream of cool air that is directed into and out of the base module M without interfering in any way with the separate air flow through the lamp compartment defined by the partition P and cover C. Once again, the air flow through the base module M would be in a reverse direction if the lamp unit L were burned in a "base-up" rather than the illustrated "base-down" position.

When the lamp unit is operated base-down, ambient cooling air for base module M enters through openings 40 and ambient cooling air for cooling inside the cover C enters through openings 36. On the other hand, when the lamp unit is operated base-up, the ambient cooling air enters through openings 39 and 24 for cooling the base module M and cover C, respectively. Thus, in either orientation, the openings for the cooling air are below the openings through which heated air vents.

Figure 7:
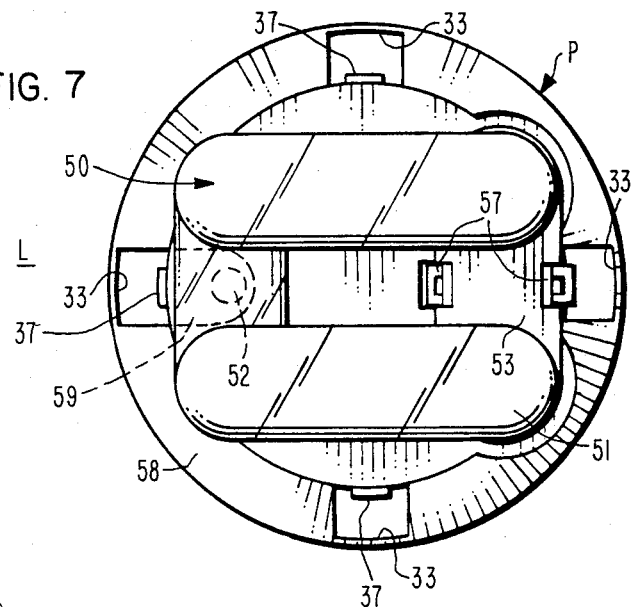
FIG. 7 is a top plan view of the lamp unit with the cover component removed.

The four peripherally-disposed air passageways into the cover compartment which contains the fluorescent lamp 50 are clearly shown in FIG. 7 (which is a top plan view of the lamp unit L with the cover C removed). As will be noted, the four air-duct portions 33 of the partition member P provide four slot-like passageways through the partition P at four radially spaced locations around the periphery of the partition. The snap-lock lugs 57 on the partition member P which engage the grooved-and-tongued portions of the fluorescent lamp base 53 are also clearly shown in this view.

Figure 8:
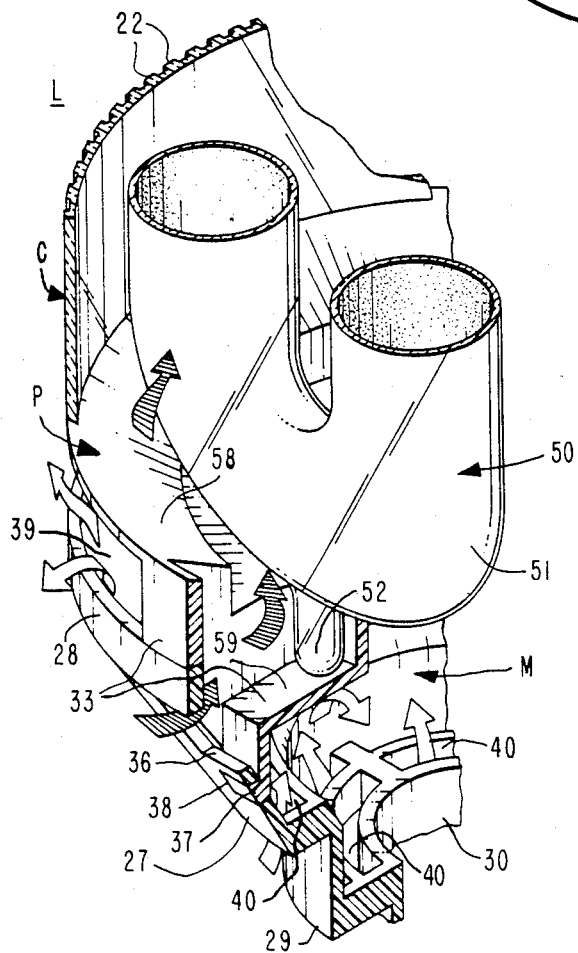
FIG. 8 is an enlarged fragmentary perspective view of a portion of the lamp unit illustrating the manner in which the "cooling tip" portion of the fluorescent lamp envelope is directly exposed to the air which flows through one of the air ducts in the partition structure.

In order to ensure that the "cooling tip" portion 52 of the fluorescent lamp 50 is cooled in an efficent manner during lamp operation, one of the air-duct portions 33 of the partition P is aligned with the envelope tip 52 and the associated portion of the partition P is cut away to provide a recess or cavity 59 which accommodates the cooling tip and permits it to extend into the partition without physically contacting it. As shown in FIG. 8, the cooling tip 52 of the fluorescent lamp envelope 51 is exposed to the stream of cool ambient air that enters the recessed portion 59 of the partition member P through the associated air duct 33 and port 36 (as indicated by the broken-line arrows). As in the preceding figures, the flow of cooling air through the base module M is indicated by the solid-line arrows. The mercury-condensing chamber within the fluorescent lamp 50 defined by the envelope appendage 52 is accordingly cooled directly by the stream of ambient air at its point of entry into the lamp unit L when the lamp unit is burned in a "base-down" position. This maintains the tubulation 52 at the proper operating temperature and ensures that the mercury-vapor pressure within the fluorescent lamp 50 is properly regulated for optimum light output, even when the lamp unit is burned in a "base-up" position and the flow direction of cooling air through the unit is reversed.

As shown in FIG. 9, the cover C, fluorescent lamp base member 53, partition member P, circuit-mounting panel 61 and the base module M are so constructed that they are adapted to be snap-fitted together to form the required housing and support structure for the fluorescent lamp 50 and electronic circuit 60. This very desirable mode of assembly is achieved by providing a pair of upstanding snap-lock lugs 57 on the partition member P which engage the grooves 55 and tongues 56 on the sides of the plastic base member 53 in the manner previously described. The cover C has a pair of tab-like extensions 62 on opposite sides that extend into the associated pair of air ducts 33 and snap interlock with suitable slots 35 provided at the ends of the outer faces of the ducts. Each of the air ducts 33 are, in turn, provided with a cleat-like element 37 that is located and dimensioned to engage and snap interlock with slot apertures 38 in the tapered wall portion 27 of the base module M.

The circuit board panel 61 which serves as a mount for the electronic circuit is fastened in snap-like fashion to the underside of the partition member P by a pair of protruding clasps 62 on the underside of the partition member which engage and interlock with a pair of slots 63 located on opposite sides of the circuit board panel 61. Panel 61 is also provided with four apertures 64 which are aligned with another set of apertures 65 in the partition member P and permit the pin contacts 54 of the fluorescent lamp 50 to engage the socket contacts within the base module M when the fluorescent lamp is plugged into the partition member P and panel 61. The circuit board panel 61 is also provided with an arcuate cutout 66 which accommodates the elongated portion of the air duct 33 which defines the cavity 59 for the cooling tip portion 52 of the fluorescent lamp 50 when the lamp is plugged into the partition member P and snap-locked in place.

FIRST ALTERNATIVE EMBODIMENT (FIGS. 11–17)

A modified compact lamp unit $L_a$ which is constructed to provide a larger number of peripheral passageways for the "dual-flow" streams of cooling air through the lamp and electric-circuit compartments of the unit is shown in FIGS. 11–17.

As will be noted in FIGS. 11–14, the lamp unit $L_a$ has the same basic components consisting of a light-transmitting cover $C_a$ and a base module $M_a$ that are coupled together by an interfitting partition member $P_a$. As in the previous embodiment, the module $M_a$ is terminated by a suitable base component such as a threaded base member 20a having the usual end contact 21a and the cover $C_a$ encloses a convoluted fluorescent lamp (not shown).

In contrast to the previously described embodiment shown in FIGS. 1–10, the components of lamp unit $L_a$ are structured to provide a series of eight air ducts 33a at equally spaced points around the periphery of the lamp unit which cooperate with a like number of ports 36a in the base module $M_a$ to provide eight passageways which allow air to enter the lamp compartment defined by the cover $C_a$ and then escape through the vent openings 24a in the top of the cover. In accordance with this embodiment, the annular end wall 25a and strap segments 26a of the cover $C_a$ are so shaped so that the vent openings 24a comprise a central circular aperture that is encircled by a set of four arcuate openings. The partition member $P_a$ has a series of eight recessed portions 32a which, together with the circular flange 28a of the base module $M_a$, provide a series of eight arcuate vent openings 39a around the periphery of the lamp unit $L_a$.

As in the previous embodiment, the base module $M_a$ has an open-gridlike structure at the ends of its tapered portion 27a and cylindrical portion 29a which provide arcuate vent openings 40a (see FIG. 14) that permit air to enter the base module $M_a$ and pass through the peripheral openings 39a after circulating through the base module compartment.

The unobstructed air path through the base module Ma is shown in FIG. 15 (such air flow being indicated by solid-line arrows as in the previous embodiment). As will be noted, ambient air enters through the vent openings 40a at the basal end of the module and, after flowing around and past the components of the electrical circuit 60a (here shown in block form for illustrative purposes) located in the module compartment, leaves the lamp unit $L_a$ through the peripheral slot vents 39a provided by the recessed portions 32a of the partition component $P_a$.

The unimpeded air-flow path through the lamp compartment is shown in FIG. 16 and indicated by the dashed-line arrows. As indicated by such arrows, when the lamp unit $L_a$ is burned in the "base-down" position cool ambient air enters the cover compartment through the eight port openings 36a in the base module $M_a$, passes through the connecting air ducts 33a into the cover compartment $C_a$ where it sweeps past the fluorescent lamp 50a and then exits through the vent openings 24a in the top of the cover. Since the cooling air enters through twice the number of air passageways in this embodiment compared to the previous embodiment, the air flow through the cover and module compartments is more uniform and evenly distributed.

Figure 17:
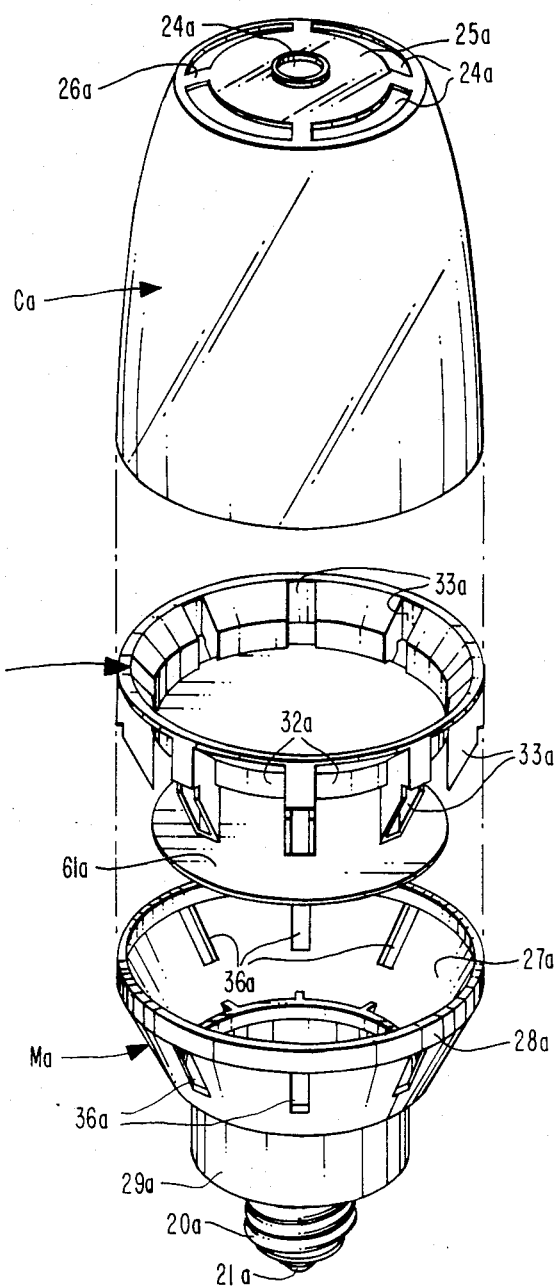
FIG. 17 is an exploded perspective view of the cover, partition and base module components of the alternative lamp unit embodiment of FIGS. 11–16 illustrating the manner in which these parts interfit with one another.

As illustrated in FIG. 17, the separate compartments for the fluorescent lamp and electrical-circuit components of the lamp unit and the segregated air flow for such compartments is obtained by constructing the cover $C_a$, partition $P_a$, circuit board panel 61a and base module M in such a fashion that they nestingly interfit with one another and automatically define the required compartments and air passageways. If desired, the various parts can be provided with suitable locking tabs, apertures, etc. to permit them to be snap-fitted together as in the previous embodiment even through such snap-locking elements are not shown in FIG. 17.

SECOND ALTERNATIVE EMBODIMENT (FIGS. 18-24)

Figure 18:
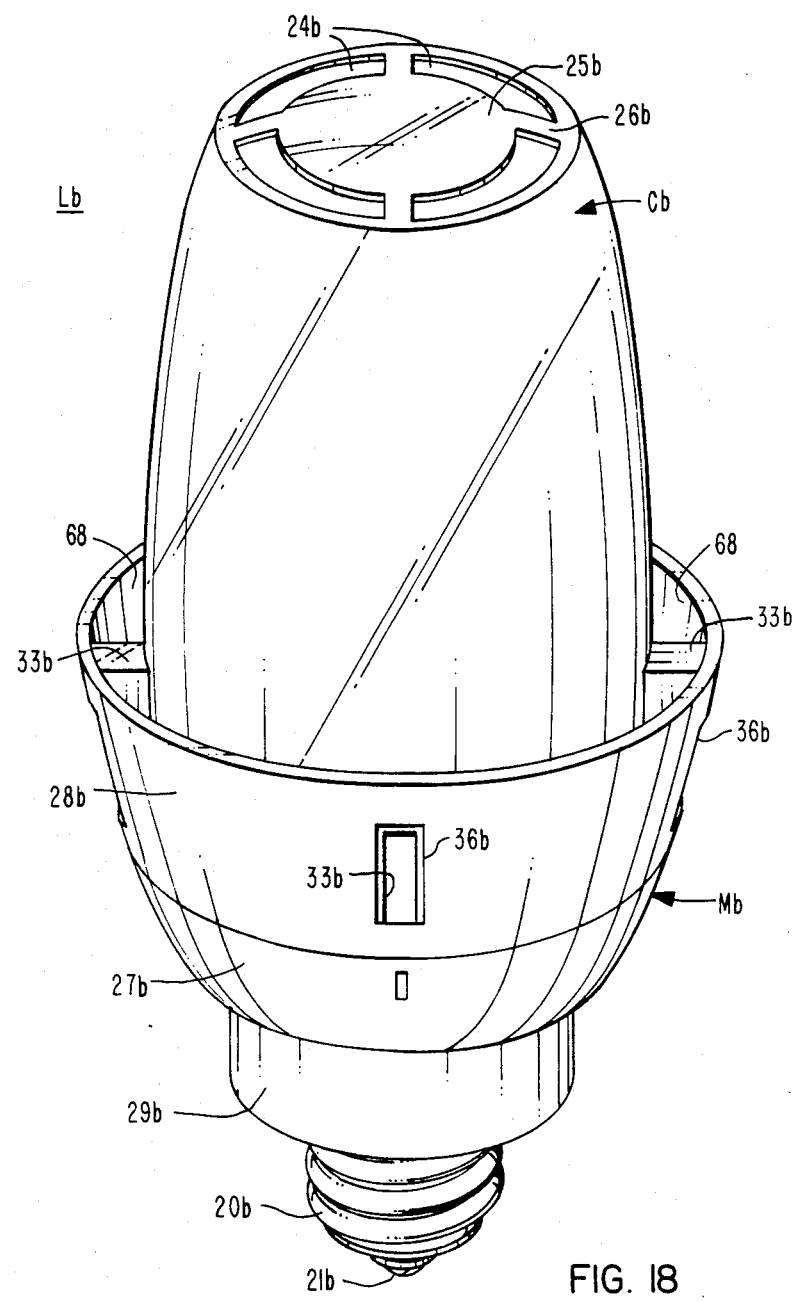
FIG. 18 is an enlarged perspective view of a second alternative embodiment of a compact lamp unit which embodies the invention.
Figure 20:
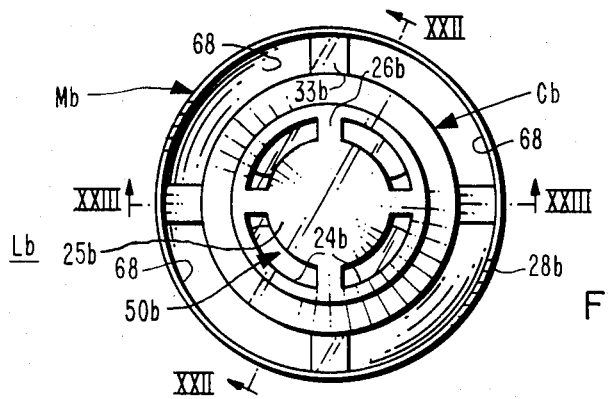
FIGS. 19–21 are side-elevational, top and bottom plan views, respectively, of the alternative embodiment shown in FIG. 18.
Figure 19:
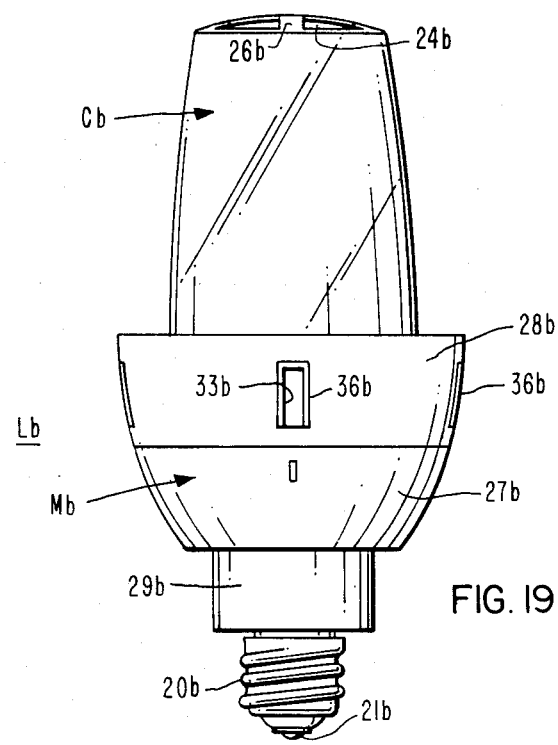

Another type of compact lamp unit $L_b$ which embodies the separate compartment and segregated air-cooling concepts of the present invention in still another form is shown in FIGS. 18-24. As illustrated in FIGS. 18-20, the flange portion 28b of the base module $M_b$ is enlarged to form a curved shroud or cowling that encircles the lower portion of the cover $C_b$. The flange 28b is also larger in diameter than the encircled part of the cover Cb and thus provides a series of arcuate passageways 68 that extend around the periphery of the lower portion of the cover.

Figure 23:
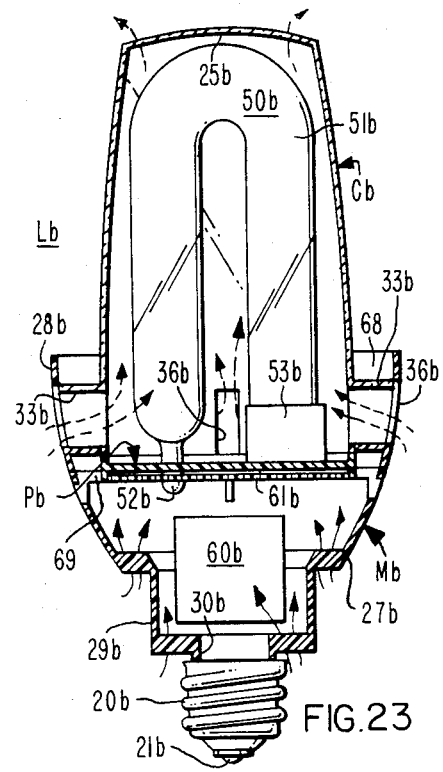
Figure 24:
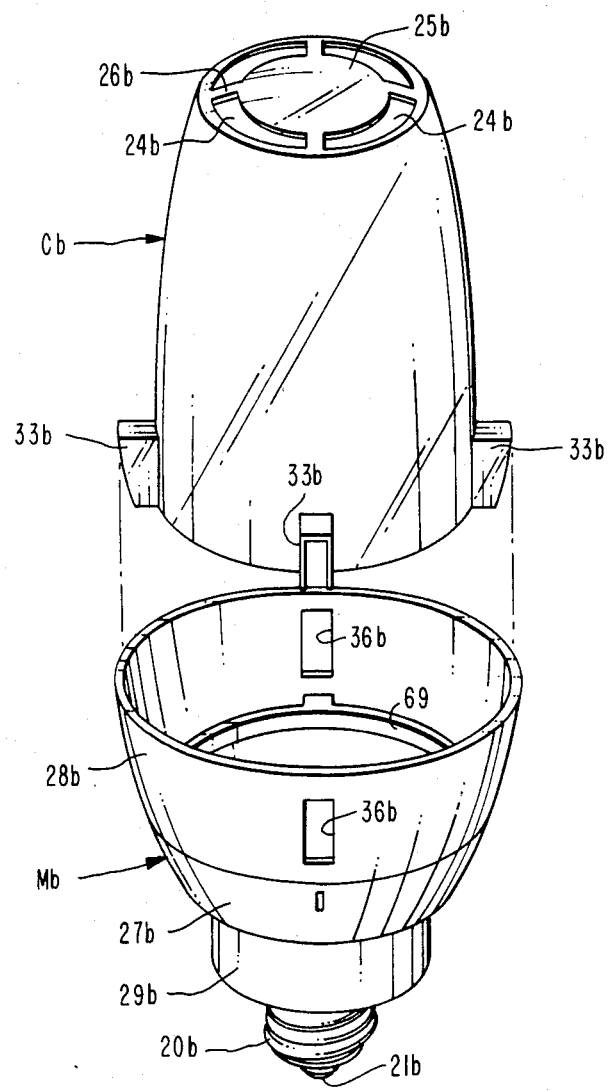
FIG. 24 is an exploded perspective view of the cover and base module components employed in the second alternative embodiment shown in FIGS. 18–23.
Figure 25:
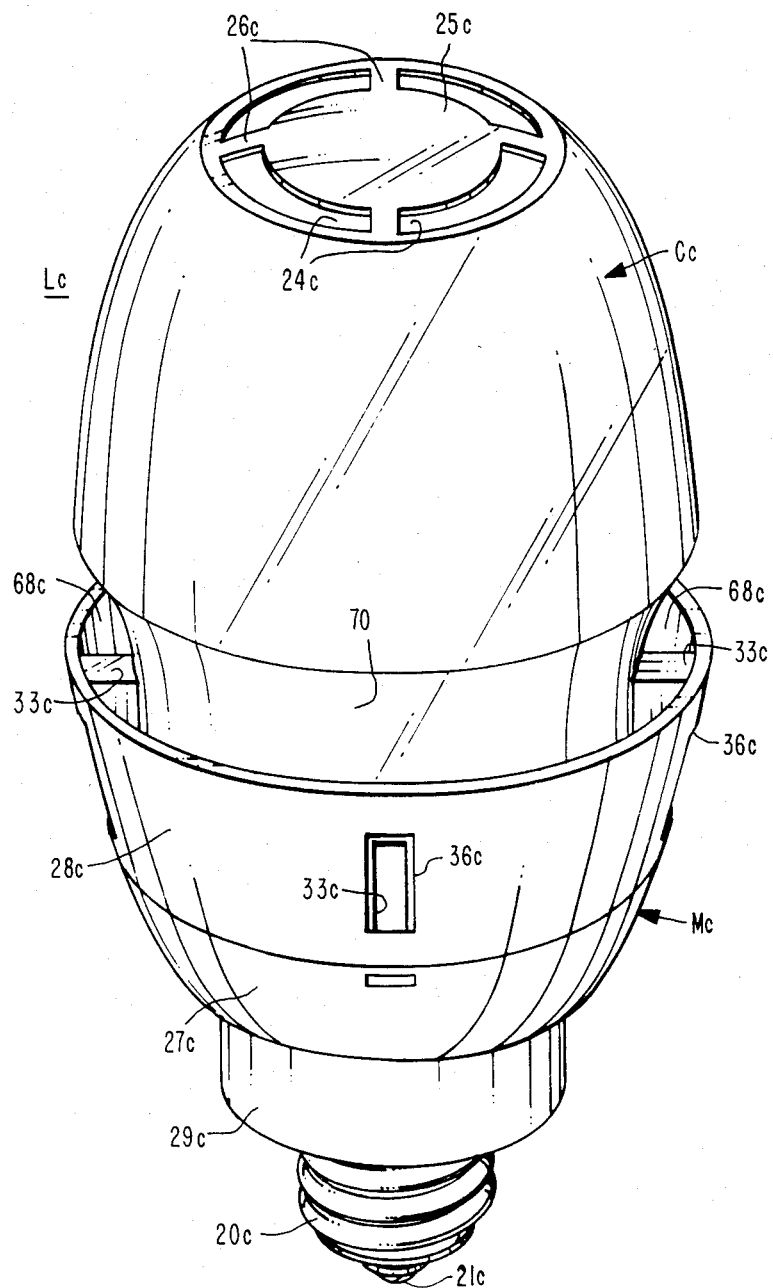
FIG. 25 is an enlarged perspective view of a third alternative embodiment of a compact fluorescent lamp unit which embodies the invention.
Figure 27:
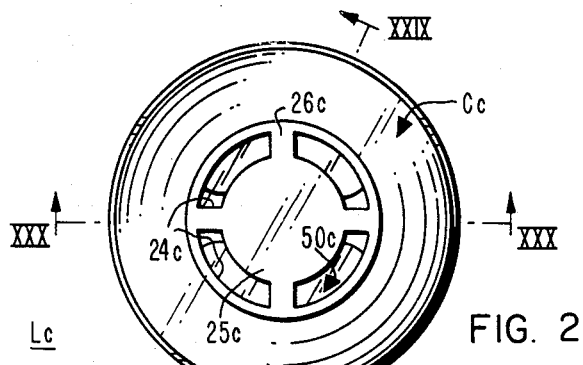
FIGS. 26–28 are side elevational, top and bottom plan views, respectively, of the alternative lamp unit embodiment shown in FIG. 25.
Figure 26:
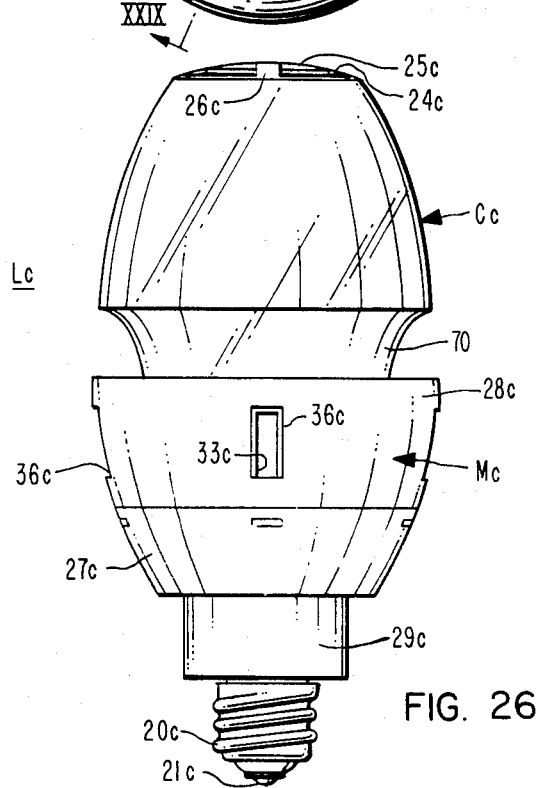
Figure 28:
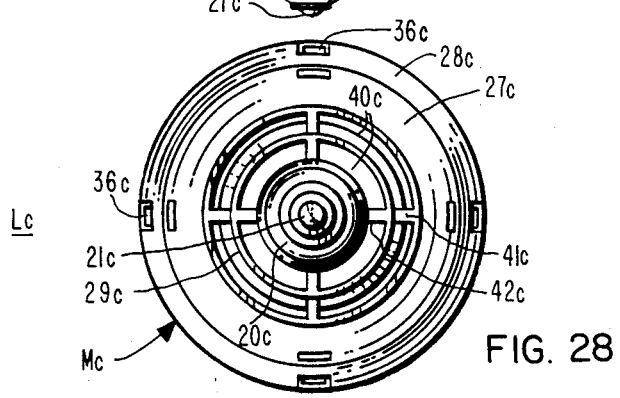
Figure 31:
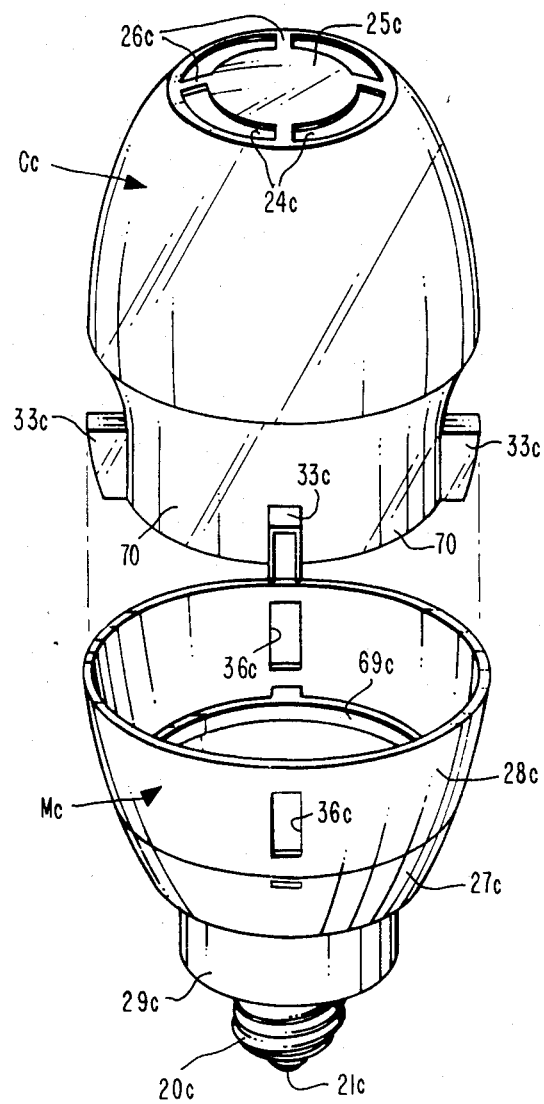
FIG. 31 is an exploded perspective view of the cover and base module components employed in the third alternative embodiment shown in FIGS. 25–30.

As most clearly shown in FIG. 24, in accordance with this embodiment the air ducts 33b are formed as integral parts of the cover $C_b$ instead of the partition structure and are so shaped and located that they register with the port openings 36b in the flange 28b of the module when these components are fitted together in assembled relationship. The partition member $P_b$ and circuit board panel 61b are attached to the bottom of the cover $C_b$ (see FIGS. 22 and 23) and seat against a protruding lip 69 within the base module $M_b$ when the parts are assembled. The module compartment is thus separated from the cover compartment, as in the previous embodiment, and provides space for the electric circuit 60b.

Figure 21:
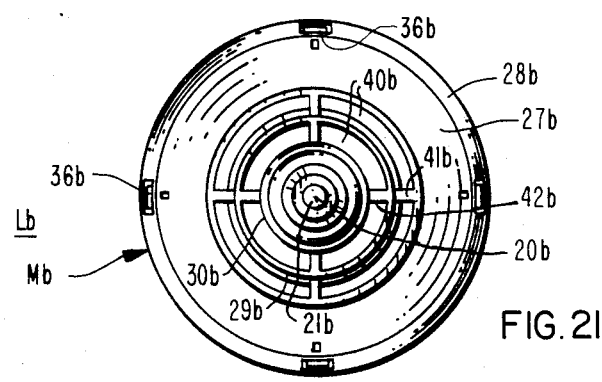

As illustrated in FIGS. 20 and 21, the top of the cover $C_b$ has a series of arcuate vents 24b that are defined by a circular segment 25b and strap portions 26b and the basal end of the module $M_b$ has vents 40b formed by the grid-like support structure for the tapered portion 27b and hollow cylindrical portion 29b of the module. As will be noted in FIGS. 18, 19 and 22-24, the profile of the tapered portion 27b of the module $M_b$ is curved to match that of the enlarged flange 28b and provide a smooth surface.

Figure 22:
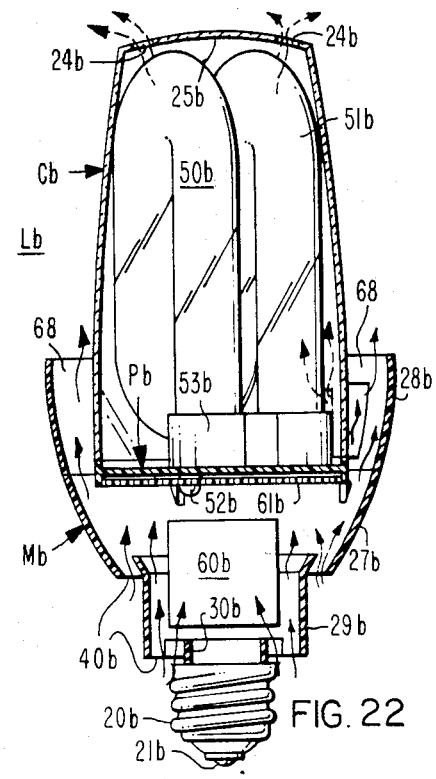
FIGS. 22 and 23 are sectional views through the second alternative embodiment (along lines XXII—XXII and XXIII—XXIII of FIG. 20, respectively) showing the two separate air-flow patterns through the cover and base module compartments in accordance with this alternative embodiment.

The unobstructed air-flow pattern through the base module $M_b$ is shown in FIG. 22 and, as indicated by the solid-line arrows, ambient air enters through the basal vent openings 40b, circulates up through the module compartment around the components of the electrical circuit 60and then sweeps along the tapered portion 27of the module and emerges via the peripheral passageways 68 between the module flange 28b and bottom wall portion of the cover $C_b$.

The air-flow pattern through the lamp compartment is shown in FIG. 23 and, as denoted by the dashed-line arrows, allows ambient air to enter through the ports 36b and flow up through the air ducts 33b into the cover $C_b$, past the convoluted fluorescent lamp 50b and then through the vent openings 24b at the top of the cover.

THIRD ALTERNATIVE EMBODIMENT (FIGS. 25-31)

A modified compact lamp unit $L_c$ which also embodies the invention is shown in FIGS. 25-31. As will be noted, the construction of this unit is similar to that of the FIGS. 18-24 embodiment in that it also uses a base module $M_c$ that has an enlarged cowl-like flange 28c which extends from the tapered portion 27c of the module. In accordance with this embodiment, however, the cover component $C_c$ is flared inwardly at its lower end to provide a wider opening for the air which flows through the base module $M_c$ and leaves the lamp unit through the peripheral passageways 68c between the module flange 28c and the constricted end portion 70 of the cover. The air ducts 33c are again formed as integral parts of the cover component $C_c$ (as shown more particularly in FIG. 31) and the partition member $P_c$ extends across and closes the bottom of the cover when the latter is seated on the interior lip 69c of the base module (see FIGS. 29-31).

Figure 29:
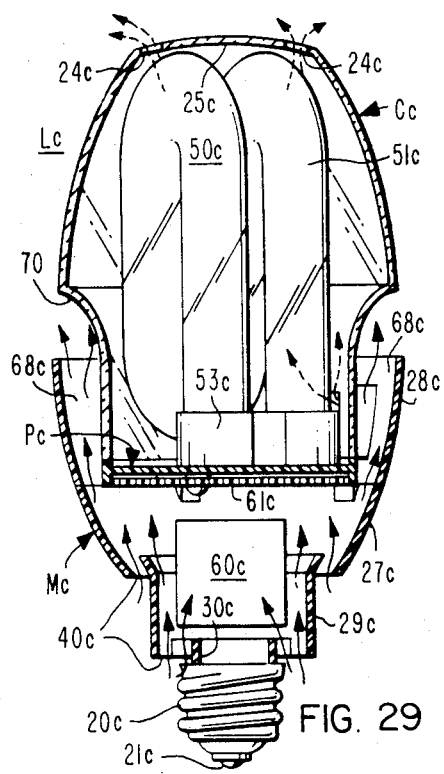
FIGS. 29 and 30 are longitudinal sectional views through the third alternative embodiment (along lines XXIX—XXIX and XXX—XXX of FIG. 27, respectively) showing the independent air-flow paths provided by the construction employed in this alternative embodiment.

The free air flow through the base module compartment of the lamp unit $L_c$ is shown in FIG. 29 and, as indicated by the solid-line arrows, permits air to enter the base module $M_c$ through the basal vent openings 40c, circulate past the electric circuit 60c mounted on circuit board panel 61c and then pass through the peripheral passageways 68c between the module flange 28c and necked-in portion 70 of the cover component $C_c$ where it emerges from the lamp unit through the circumferential gap formed by the inwardly flared part of the cover.

Figure 30:
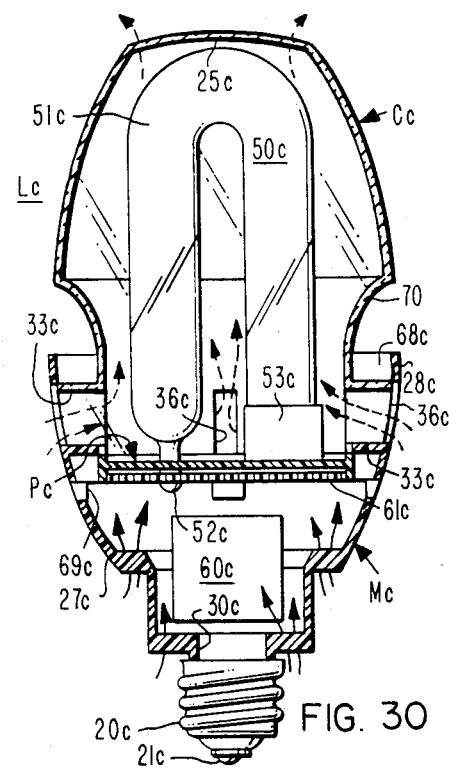

As shown in FIG. 30, air flows along a completely separate path (indicated by the dashed-line arrows) through the cover compartment and past the convoluted fluorescent lamp 50c by entering the lamp unit $L_c$ through the ports 36c in the tapered portion 27c of the base module $M_c$ and passing through the associated air ducts 33c into the cover $C_c$, finally emerging through the vent openings 24c at the top of the cover.

While the various lamp units as illustrated and described contain a miniature electronic circuit in the base module compartment which permits the U-bent fluorescent lamp to be operated in a DC mode from an AC power supply, it will be apparent to those skilled in the art that a magnetic type ballast circuit housed in the module can also be used to operate the lamp on AC using a conventional glow-start switch and associated components.

It will also be apparent that each of the protective covers can be provided with light-diffusing flutes or refractor elements even though such elements are only illustrated in the FIGS. 1-10 embodiment.

I claim:

1. An electric lamp unit that is adapted for use as a compact energy-efficient light source and comprises:

an electric discharge lamp that has an envelope which defines an elongated arc path and produces a light output that is adversely affected by elevated operating temperatures, electric circuit means coupled to said discharge lamp and adapted to energize the lamp when connected to a suitable power supply, means protectively enclosing said discharge lamp and electric circuit means comprising a housing having a first compartment that contains the discharge lamp and a second compartment that contains the electric circuit means and is physically isolated from the first compartment, and means integral with said housing defining air passageways which permit ambient air to circulate through said compartments in two different flow patterns that are confined to the respective compartments so that said compartments are air-cooled independently of one another when the lamp unit is energized and in use, said means defining air passageways having respective openings for receiving ambient air to flow into said first and second compartments and respective openings for venting heated air from inside said first and second compartments, and said openings for receiving ambient air being positioned lower than said openings for venting heated air whether the electric lamp unit is operated with said first compartment above or below said second compartment.

2. The electric lamp unit of claim 1 wherein said electric circuit means includes one or more electrical components that are also heat-sensitive.

3. The electric lamp unit of claim 2 wherein the electric circuit means comprises a solid-state type electronic circuit having a capacitor and transistors which are adversely affected by excessive heat.

4. The electric lamp unit of claim 1 wherein the protective housing is internally divided into the said compartments by a transverse partition structure which is conformed to provide an air duct that constitutes part of the said air-passageway defining means.

5. The electric lamp unit of claim 4 wherein said air duct communicates with the housing compartment that contains the discharge lamp and, together with a vent opening in said housing, defines a passageway which permits ambient air to flow directly into and through the lamp-containing compartment of the housing.

6. The electric lamp unit of claim 1 wherein the air-passageway defining means for the housing compartment that contains said electric circuit means comprises vent openings in the associated portion of the housing that are so spaced and located that ambient air can flow into and out of said housing compartment through said vent openings and thus cool the electric circuit means located within said compartment.

7. The electric lamp unit of claim 6 wherein the protective housing is internally divided into said compartments by a transverse partition structure which is conformed to provide an air duct that constitutes part of the air-passageway defining means for the lamp-containing compartment of the unit.

8. The electric lamp unit of claim 7 wherein the portion of the protective housing that defines that lamp-containing compartment also has a vent opening therein which cooperates with said air duct to provide free air flow through the lamp-containing compartment.

9. The electric lamp unit of claim 8 wherein;

said electric discharge lamp is of the low-pressure type and has a tubular convoluted envelope with a pressure-regulating appendage that protrudes from the convoluted envelope, the partition structure defines a plurality of air ducts that communicate with a like number of port openings in the housing and thus permits cooling air to flow through the partition structure at predetermined spaced locations, and said discharge lamp and partition structure are so constructed and arranged that the pressure-regulating appendage of the lamp envelope is in sufficient proximity to one of said air ducts that the appendage is exposed to the current of cool ambient air which flows through the air duct when the unit is energized and in use.

10. The electric lamp unit of claim 9 wherein said discharge lamp comprises a fluorescent lamp and the pressure-regulating appendage comprises a protruding tip-like segment of a medial portion of the convoluted lamp envelope.

11. An electric lamp unit that is adapted for use as a compact energy efficient light source in a socket of the type employed for incandescent-type lamp bulbs, said lamp unit comprising;

a low-pressure electric discharge lamp that has an elongated tubular envelope which is bent into convoluted tridimensional form and contains an ionizable medium which requires that the operating temperature of the lamp be controlled for optimum light output, electric circuit means coupled to said discharge lamp and adapted to energize and operate the lamp when connected to an alternating-current power supply, a housing protectively enclosing said discharge lamp and electric circuit means comprising a light-transmitting cover that is secured to a base module, a partition structure laterally dividing said housing into two separate compartments that are defined by said cover and base module and are so arranged and shaped that the discharge lamp is disposed within the cover compartment and the electric circuit means is located within the base module compartment, and means integral with said housing and partition structure providing passageways which permit ambient air to enter and flow through said compartments along different and separate paths so that said compartments are air-cooled independently of one another when the lamp unit is placed in the socket and is in use, said means providing air passageways having respective openings for receiving ambient air to flow into said separate compartments and respective openings for venting heated air from inside said separate compartments, and said openings for receiving ambient air being positioned lower than said openings for venting heated air whether the electric lamp unit is operated in a base-up or base-down position.

12. The electric lamp unit of claim 11 wherein;

the cooling-air passageways for the base module compartment comprises spaced-apart vent openings in the base module, and the cooling-air passageways for the cover compartment comprises at least one vent opening in the cover and a channel that extends through the partition structure to a port opening in an adjoining portion of the base module.

13. The electric lamp unit of claim 12 wherein;
the convoluted discharge lamp and protective housing are both of elongated configuration,
the base module has a terminal end portion that is defined by a wall which is offset from the longitudinal axis of the lamp unit and thus provides a vent opening thereat, and
the partition structure has a recessed portion which is located on the outer periphery of the partition structure and defines another vent opening thereat which, together with the vent opening in the terminal end portion of the base module, provides an air-flow path through said base module.

14. The electric lamp unit of claim 13 wherein:
said discharge lamp comprises a fluorescent lamp that is held in upstanding position within the cover by the partition structure, and
the partition structure comprises a dish-like member that is secured in nested interfitting relationship within the peripheral rim of the base module.

15. The electric lamp unit of claim 14 wherein;
the base module has a plurality of port openings that are disposed at spaced intervals around the periphery of the module, and
the dish-like partition member has air duct portions which define a plurality of channels that are also located along the periphery of the partition member and communicate with the respective port openings in the base module so that ambient air can enter the cover compartment at a number of places around the periphery of the lamp unit.

16. The electric lamp unit of claim 15 wherein the fluorescent lamp has an integral mercury-vapor pressure regulating means comprising a protruding tip-like segment of the envelope that is substantially aligned with and extends into one of the air duct portions of the dish-like partition member and is thus directly exposed to the flow of ambient air which passes through said air duct portion.

17. The electric lamp unit of claim 16 wherein;
the top portion of the cover has a plurality of vent openings therein,
the fluorescent lamp has a tubular glass envelope that is of triple-U-bent configuration and has base means that permits the lamp to be removably plugged into socket means that are held in place within the lamp unit by the partition member, and
the tip-like segment of the lamp envelope protrudes from a U-bent portion of the envelope that is proximate the partition member.

18. The electric lamp unit of claim 17 wherein the fluorescent lamp base means is of such configuration that it effects a snap-interlocking juncture with clasping means carried by the partition member.

19. The electric lamp unit of claim 11 wherein:
the electric discharge lamp comprises a fluorescent lamp, and
said electric circuit means comprises a solid-state electronic circuit the components whereof are held in place within the base module by the partition structure.

20. The electric lamp unit of claim 19 wherein said electronic circuit comprises a transistorized inverter circuit that is adapted to convert an alternating-current input to a direct-current output that is applied to the fluorescent lamp when the lamp unit is in use and energized.

21. The electric lamp unit of claim 20 wherein:
the base module and cover are both of circular cross-section, and
the base module is of tapered configuration and terminated by a threaded base member, the portion of the module adjacent the base member being of larger lateral dimension than the base member and defining peripheral openings that serve as air vents for the base module.

22. An electric lamp unit comprising:
a housing having a base portion, a light-transmissive cover mounted on said base portion and extending lengthwise of said housing, and a partition dividing said housing transversely into two non-communicating compartments including a base compartment defined by said partition and said housing base portion and a cover compartment defined by said partition and said housing cover;
said housing base portion having ventilation openings spaced separated lengthwise of said housing to provide communication between the inside and the outside of said base portion and establish an air flow path through said base portion along the length direction of said housing;
means comprising a conduit open at said base portion at a position intermediate said ventilation openings spaced in the length direction of said housing and extending through said base portion into said cover without communicating with the interior of said base portion for flowing air between the exterior of said housing and the interior of said cover;
vent openings to the lamp cover remote from said base portion to establish an air flow path through said cover which opens to the exterior of said housing;
an electric lamp within said cover compartment; and
an electric lamp operating circuit within said base portion.

* * * * *

UNITED STATES PATENT AND TRADEMARK OFFICE
CERTIFICATE OF CORRECTION

PATENT NO. : 4,503,360

DATED : March 5, 1985

INVENTOR(S) : DENIS E. BEDEL

It is certified that error appears in the above-identified patent and that said Letters Patent is hereby corrected as shown below:

Claim 22, Col. 16, line 47, after "openings" delete "to" and insert --in--.

Signed and Sealed this

Thirteenth Day of August 1985

[SEAL]

Attest:

DONALD J. QUIGG

Attesting Officer

Acting Commissioner of Patents and Trademarks